(12) United States Patent
Cartmell

(10) Patent No.: US 8,407,093 B2
(45) Date of Patent: Mar. 26, 2013

(54) ADVERTISING TECHNIQUE

(76) Inventor: Brian R. Cartmell, Mercer Island, WA (US)

( * ) Notice: Subject to any disclaimer, the term of this patent is extended or adjusted under 35 U.S.C. 154(b) by 1682 days.

(21) Appl. No.: 11/321,227

(22) Filed: Dec. 28, 2005

(65) Prior Publication Data
US 2007/0150340 A1    Jun. 28, 2007

(51) Int. Cl.
*G06Q 30/00* (2006.01)
*G07G 1/14* (2006.01)

(52) U.S. Cl. .................................................. 705/14.64

(58) Field of Classification Search ..................... 705/14
See application file for complete search history.

(56) References Cited

U.S. PATENT DOCUMENTS

| | | | |
|---|---|---|---|
| 2002/0087403 A1* | 7/2002 | Meyers et al. | 705/14 |
| 2003/0115481 A1* | 6/2003 | Baird et al. | 713/201 |
| 2006/0155615 A1* | 7/2006 | Loo et al. | 705/27 |
| 2006/0158452 A1* | 7/2006 | Borger et al. | 345/582 |
| 2006/0158616 A1* | 7/2006 | Borger et al. | 353/69 |
| 2007/0081744 A1* | 4/2007 | Gokturk et al. | 382/305 |

* cited by examiner

*Primary Examiner* — Colleen Hoar

(57) ABSTRACT

A method for purchase of goods and/or services comprising the steps of,
(a) a user placing a personal advertisement through a service provider or vendor with a image or picture which is blurred on partially blurred as to body portions or plurality of body portions, or to which contains text which is strategically blurred, and
(b) the service provider or vendor alerting the user to one or more responses to the advertisement or other message, optional with blurred and/or partially obscured images on pictures of a respondent or text by way of e-mail, television, written or printed material, SMS, EMS and/or MMS messaging.

13 Claims, 3 Drawing Sheets

Sign up and give me a call!

Jane Doe XXX-XXX-XXXX

ADVERTISING TECHNIQUE

TECHNOLOGY FIELD

The present invention relates to advertising or offering goods or services, and more specifically to the use of graphical images in the performance of such advertising or offering.

BACKGROUND

The advertising, marketing and sales of goods and services have seen explosive growth in recent years with new and effective sales techniques and venues constantly being sought after for increased revenue generation. Where television once provided an expansive new medium for advertising and sales advantages, the Internet and mobile communication devices, such as mobile telephones and PDA's, now provide unheralded advantages in reaching an ever expanding and virtually limitless number of people for potential sales of goods and services in virtually any location.

Many newer technologies enable a potential buyer or consumer to view the goods and/or services online before or in conjunction with conducting a transaction. In one example, an individual may be interested in joining an online dating service or engaging in online conversation with other members of the service. Often, these individuals may be presented with images of existing members of the service to entice the individuals to become members. However, in some circumstances it is disadvantageous for visitors to be able to view the existing members because, particularly in the case of dating services, browsing the existing members is the core of the service.

An adequate technique or mechanism for advertising online goods and/or services has eluded those skilled in the art, until now.

SUMMARY OF THE INVENTION

The present invention provides an advertising and marketing method and system in which goods, services and/or a person(s) facial or body image, or portions thereof, are shown in a blurred or partially blurred form, or are otherwise partially obscured to a degree, such as to effectively entice or pique the interest of others into committing or engaging in an act, such as paying a fee, to view a non-blurred or obscured image, or to view unblurred and non-obscured words or phrases, and possibly to engage and/or purchase services and goods.

In one embodiment, the image of a person's face or body portions may be shown in blurred and/or partially obscured form, such as on television or the Internet or in a multimedia message with picture, graphics or animation, for the advertising of dating, chat or matchmaking services, which an interested party may decide to pay to view in a non-obscured manner, perhaps for possible contact.

In another embodiment, a provocative image or picture or person may be clearly shown, but with contact information and other pertinent textual subject matter blurred or obscured such as to entice a fee payment from a person to view such subject matter clearly.

In another embodiment goods and/or services may be offered in blurred and/or partially obscured form in advertisements, or blurred or obscured textual descriptions thereof or of important information relating thereto to entice replies or inquires for further inquiry.

In yet further embodiments there is provided a method for accommodating a person's desires of meeting, locating and/or attracting others for dating, contact or human discourse, or a person's desires of acquiring certain objects or collectibles, or news in general, or business, financial or sports/betting information and the like, or any combination thereof, by a person placing or answering a blurred or partially obscured advertisement on the Internet, television, SMS text or MMS multimedia messages, or other public medium such as newspaper and the like. Upon receiving one or more positive replies from a member or members of the public at large, along with any other information of interest, such as personal information or certain product information, financial or business information and the like, the person placing the initial advertisement or inquiry is contacted, such as by one or more SMS text messages or one or more MMS messages, from a service provider alerting the person of such positive interest and including a blurred or obscured image or picture of a party with positive interest. Further, the person may be provided with contact information or other information of the interested party, or party with positive product news and the like, with unblurred or non-obscured images or pictures or non-obscured text and the like upon request. The service provider may charge an assortment of fees for such services, or for enabling any of such events.

Additionally, an array of other information may also be provided, such as news, financial reports, sports/betting and/or lottery results and the like as value-added content, again optionally coupled with additional fee payment with the capability of reaching virtually anyone at virtually anytime with advertisements for virtually anything for maximum reach and effectiveness.

The invention is more fully understood with reference to the following Detailed Discussion of Preferred Embodiments with accompanying drawings.

DETAILED DISCUSSION OF PREFERRED EMBODIMENTS

All patent references, published patent applications and literature references referred to or cited herein are expressly incorporated by reference to the same extent as if each were specifically and individually indicated to be incorporated by reference. Any inconsistency between these publications and the present disclosure is intended to and shall be resolved in favor of the present disclosure.

In accordance with the present invention, there is provided an advertising and marketing method and system in which goods, services and/or person(s) facial or body image, or portions thereof, are shown or depicted in a blurred or partially blurred or otherwise obscured form such as to effectively entice or pique the interest of others into committing or engaging in an act, such as paying a fee or submitting personal information, to view a non-blurred or obscured image, words or phrase.

Figure 1:
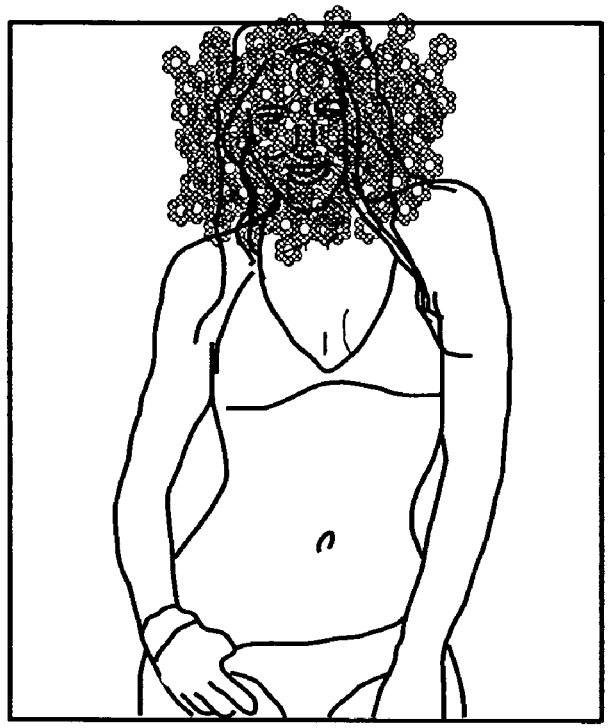
FIG. 1 illustrates in perspective view an embodiment of a mobile phone device advertising a person's likeness and body portions, some in a blurred format, in accordance with the present inventive method and system.

In one embodiment of the invention, the image of a person(s) face or body portions is shown to others in blurred or otherwise partially obscured form by way of a publicly (or non-publicly) accessible medium or venue such as television, an Internet webpage, newspaper, or, for example, in multimedia messages over a mobile phone device which enables pictures, graphics, animations and audio in addition to text, for advertising, dating, chat, or matchmaking services. The blurred or partially obscured image, as shown, for example, in FIG. 1, is preferably configured to show only enough and to blur or obscure enough such that a party may become interested in viewing an unblurred or partially non-obscured image and, for example, pay a fee to view the same in an unblurred or non-obscured manner, or engage in some other act such as providing personal information for a marketing survey or anything else of value or potential value to others in exchange. As shown in FIG. 1, a woman's body in revealing bathing attire is shown with partially blurred or obscured facial features to entice the interest of others in learning more about the individual, such as for possible chatting or dating purposes.

In another embodiment, goods and/or services may be offered in a partially blurred or obscured form in advertisements to entice replies or queries thereto, or otherwise access to unblurred or unobscured images, or to words or phrases for possible help in enabling purchase or use of good and services, or the leasing, licensing or rental thereof. For example, answers to credit questions or other questions involving legal, sports, trivia, marriage counseling, tax issues and/or virtually any other topic of interest may be offered in blurred or partially obscured form to entice fee payment or other value in exchange for unblurred or non-obscured text. Practice exam questions and answers are another embodied example particularly applicable to the present invention.

Figure 2:
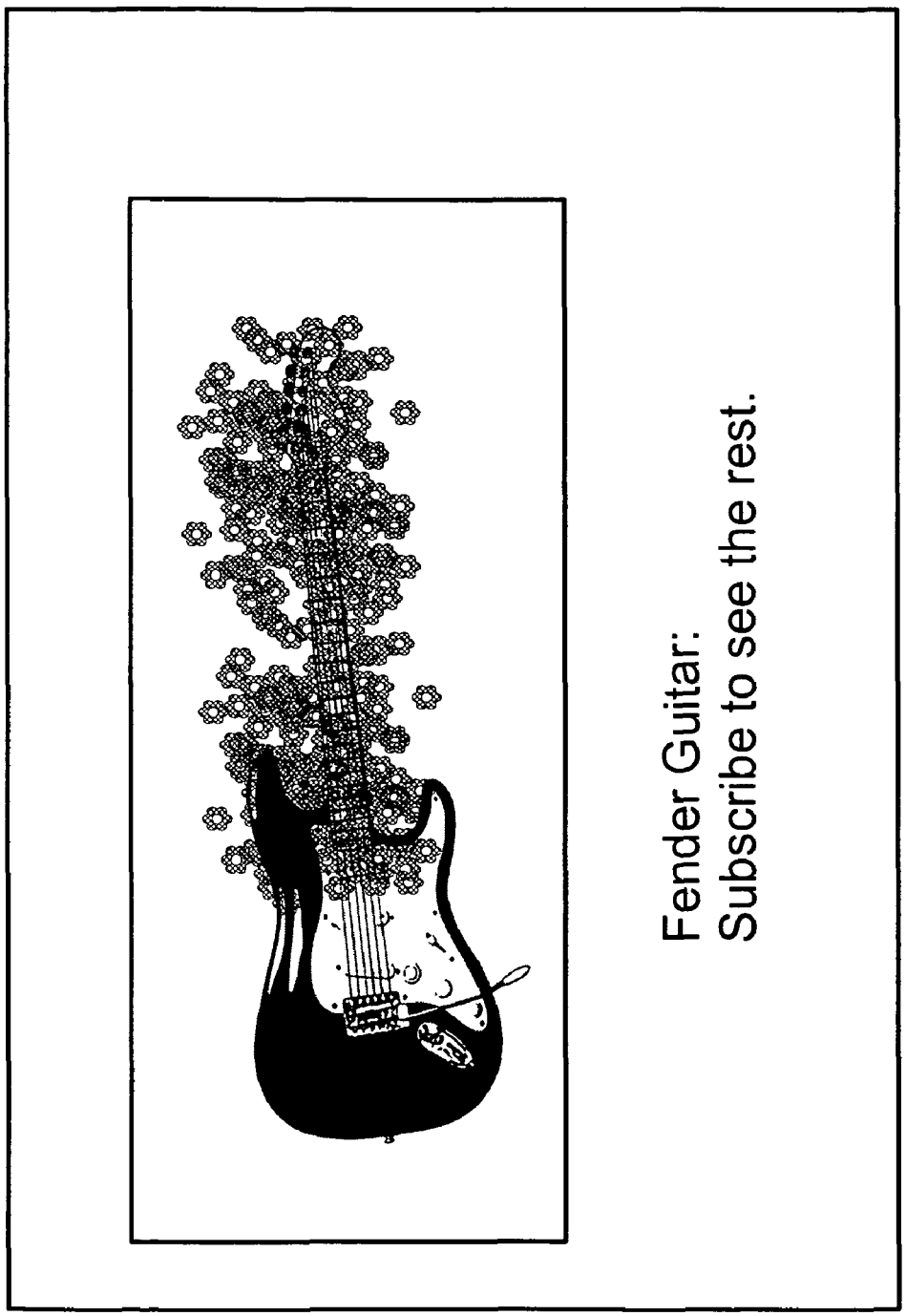
FIG. 2 illustrates in perspective view another embodiment of the present inventive method and system in which blurred or obscured images of goods and/or information is advertised on an Internet webpage.

For example, as shown in FIG. 2, there are shown blurred or partially obscured images of a rare and collectable guitar, or any other product or object such as an automobile as displayed on the Internet, an MMS enabled mobile phone device or in newsprint and the like asking interested parties to pay a fee to further view or access an unblurred or a non-obscured image and to make an offer or place a bid therefore in an auction-like setting. As illustrated in FIG. 2, a body portion of an early model rare Fender guitar may be shown in perfect condition with the rest of the product slightly blurred, or somewhat obscured. This may be the item a person has been searching long and hard for, or at least the type of item that the person will conceivably pay a fee for a clear view of the item to possibly acquire it.

As another example, a rare and collectable automobile's interior may be shown in a photograph with other portions shown blurred or partially obscured to entice those interested persons to pay to view the entire unblurred image and perhaps to engage in a purchase offer and the like.

In accordance with other embodiments of the present inventive process and system in application, a person desirous of meeting, locating or otherwise attracting others for dating, conversation, or any type of personal contact possible, may decide to place a personal advertisement with a vendor service, such as a dating service, chat service, match-making or personal introduction service, or perhaps a personnel service or business. Such advertisement is thereafter made available to the public by any number of ways, such as through the Internet by web page means, or in selected newsletters, in television advertisements or by radio, or by EMS/MMS multimedia messages and the like, all of which are contemplated for reaching one or more members of the public with the person's advertisement or personal information or other queries.

A vendor will employ a picture of the person in an advertisement, along with perhaps other information as to age, desires, sexual proclivity and obscure all or a portion of the picture image by slight or more intensive blurring, or perhaps blur the face portion while showing other provocatively portrayed body portions. One or more members of the public upon observing the advertisement may become interested and desire to further explore seeing or viewing an unblurred or non-obscured image with designs of possible contact, and will pay a fee to do so. Upon paying a fee, the interested person may receive information of interest, such as personal contact information, or input remarks to the person's advertisement or queries and the like and other personal description etc. The original placer of the advertisement is then contacted or reached by the service provider, for example, by e-mail, phone call or via an SMS text message or an EMS/MMS Multimedia message with text, graphics, images, animations, pictures, audio or a combination thereof alerting the person of such reply(s) and/or other expressed queries or interest (hereinafter "positive" replies), and optionally an abbreviated or short summary of the nature of such. The advertisement placer is also preferably concomitantly or simultaneously offered a route or means of contact to those persons replying, or perhaps a means to access a more complete description of the repliers' exact nature of interest or query, such as a telephone number, address, web page, or e-mail address and/or may be offered a blurred or partially obscured image or picture of the one replying and quoted a fee for access to a unblurred or non-obscured image to see what the interested party looks like, such as the face or body structure and the like. All or portions of the above events or transactions may be accomplished upon payment of a vending fee or transfer of other value. Payment may be conducted or consummated through a provided telephone number, an Internet web page or any other conventional or non-conventional (e.g., proprietary) means.

Further, the method and system may be offered in such a way as to require a service fee from both, or either, the original advertisement placer and/or those whose interest is piqued, or are desirous of replying to a personal advertisement for whatever reason.

In still other contemplated embodiments, there is provided a chat, dating, matchmaking, or other meeting service or business or service directed, or otherwise devoted, to finding or locating potential matches of particular qualifications, such as a select race, religion, personal preferences or perhaps gene or blood type for ancestral or health reasons to avoid potential genetic disorders. A user may place one or more advertisements with a vendor who may then alert the advertisement placer, for example, via e-mail, SMS, EMS and/or MMS messaging as to replies, queries or comments of an interested party or group, and supply blurred images and/or text which can be unscrambled for a fee.

In yet other contemplated embodiments, the present inventive method and system may be advantageously employed by the collector and discriminating collector alike to let it be known, as discreetly as desired, personal contact information along with products or services and the like available or those desired, and other information such as respective price ranges which are acceptable or desired, or any information whatsoever designed to further entice an advertisement placer to pay a fee for contact information of a replier or potential replier. In this embodiment, a picture of the product or description thereof or a description of service, etc., may be partially blurred or obscured to entice further enquiry by fee payment. For example, in the case of someone looking for a certain vintage guitar, a vendor service in accordance with the invention will allow an advertiser seeking such a product to know discreetly that a certain person is interested in selling such an object, or perhaps a similar item, or may be seeking a similar item in trade, and provide blurred or partially obscured pictures thereof, which may be viewed upon fee payment or, for example, a registration or use fee and the like.

As will be appreciated, those persons seeking any person, object or service, be it mates, chat partners, companions, partners, goods, such as autos old and new, coins, legal briefs, old examination papers, or collectibles, artwork, equipment of any sort, material of any sort or services of any sort may advantageously and conveniently locate and procure such via the method and system of the instant invention, as discretely as desired with, perhaps selective excess to unblurred or non-obscured images and without engaging in a bidding war with third parties without access to unblurred and/or obscured images of items such as one may encounter with conventional services and methods now used extensively on the Internet.

Figure 3:
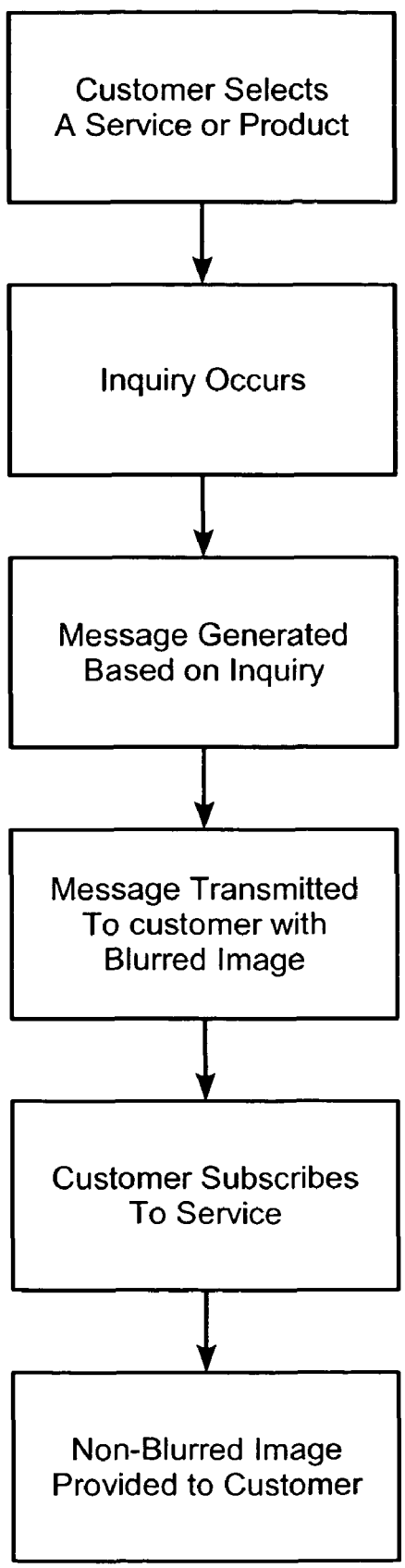
FIG. 3 illustrates in a schematic flow-chart an additional embodiment of the present invention.

Referring now to FIG. 3, there is illustrated a schematic flow-chart depicting another preferred embodiment of the invention. In this example, a customer first selects a service or product through an Internet-based service, IVR, PSMS or credit voucher, and the selection data is stored. A triggering event with respect to, or otherwise responsive to, the initial request is then awaited, such as a positive personal dating match inquiry or the notification of the availability of a certain product, collectable and the like. Upon notification of a data collection system or other receiver method or system, such as an inquiry processing center, the inquiry is collected, processed and prepared for a message, such as dissemination to the customer submitting the initial request, who is first forwarded an e-mail with attachment or other notification or by an SMS, EMS and/or MMS message that s/he has received a positive response, such as an interested personal connection, or that a certain rare collectable is available for a certain price or terms. A blurred or partially obscured image of the positive responder or of the rare collectable item is supplied and the message, be it the text or multimedia message, may also state that more information, such as contact information and the like, will be provided by a selected means as agreed, such as the advance of a fee payment schedule or options to receive and to continue to receive non-blurred pictures or images and such services.

Once a fee is paid and pertinent information is disseminated to the initial customer, such as the positive dating match or inquiry, it is now up to the customer and individual replying to consummate any transaction. However, the customer will always be alerted as to availability of interested persons, or goods and/or services and the like and access to non-obscured images, perhaps as according to a fee schedule as set out above. As may be seen in the present inventive method and system by way of text and/or multimedia messaging a customer may be alerted to a triggering event virtually at any place and time and invited to affirmatively act upon the event to meet or at least contact another person, or to view a non-blurred or obscured image thereof, or for example, to acquire a special object of interest.

In another aspect of the invention, as an illustrative example for use with such above described embodiments, a service provider may place an advertisement in a magazine, or other public medium, which may offer any service and/or product, such as a dating service and the like, which may state, "Send a text or multimedia message to the provided number and possibly include you picture if you want to date, or chat or find that special someone or friend, or perhaps locate that vintage auto that you have been looking for. Our fee is only 99 cents for each message, or message packages may be purchased separately"

An interested person viewing the advertisement may decide to respond, and forward an SMS text message from a mobile phone device, for example, using an appropriate product code to the service in response to the advertisement. Next, the service provider may respond to the interested person via a text or multimedia message, and with a blurred image of the one responding and may, for example, query the interested party whether they are sure that they want to sample the service and various of its features with a fee of, say, $2.00 for MMS message, received from the service provider with unblurred images and other pertinent contact information.

In still yet further embodiments, upon subscribing to the service the customer may next be queried by a service provider as to specific desires and/or objectives, or perhaps as to personal information, such as race, gender, gender preference, age, weight, height, smoking habits, drinking habits, occupation, education, salary, and such requirements as to other potential partners and the like, such as to provide a service provider with objective "match" criteria. Following this exercise, including such information transmission, upon the service provider's determination, for example, that a criteria-driven comparison has resulted in one or more objectively compatible-predicted matches or a probable "fit" with the subscriber and others.

The service may next forward an SMS or MMS message to the subscriber informing of such a fit along with one or more blurred pictures or images of persons reflected in the fit. At this point the customer may then be offered various options, such as, for example, (i) paying a fee for each service-forwarded SMS and/or MMS message informing of criteria related matches and related information along with non-blurred or unobscured pictures or images, or other positive events(s), (ii) paying a subscription fee to the service for an allotted time period covering, say, any number of transmitted text and/or multimedia messages, or perhaps (iii) paying a subscription fee for a predetermined number of SMS and/or MMS messages, all of which may be continued until the customer may decide to unsubscribe from the service. In this system and method one is confronted with matches or potential matches, or with information of interested parties or potentially interested parties, but must pay to see unblurred or non-obscured images or pictures thereof, and which is likely to occur.

Any conventional, or non-conventional, mobile phone device or equivalent is also contemplated for use in the inventive method and system, including cell phones from any catalog of the many mobile phone device vendors, some of which have the capability and appearance of a personal computer, or which are generally multifunctional. The inventive method is also contemplated for use with any mobile communication network.

The vending and purchase, or otherwise advertising, of any goods and services which can be advertised, bought, sold, leased, licensed or provided in any way over the telephone, television, Internet, etc., is contemplated in conjunction with the present invention. Some non-limiting examples of advertised items include, for illustration purposes only, dating services, match making services, adult content services, technical support or know-how services, language learning, tutoring or other educational services involving a virtually limitless array of subject matter and topics. Further illustrative examples of services advertised, offered, bought and sold and the like via the present inventive method and system can include any type of professional services, such as legal services, medical services, psychiatric or psychological services, marriage counseling services and counseling services in general, which can be advantageously provided by the invention in an on-the-spot emergency basis if need be. Additional examples of services include gaming, gambling, and handicapping services, architectural, business, and accounting services, and really anything or any type of information that can be sold on a time basis for a fee.

As further examples of goods and/or related services which may be advertised and purchased or provided via the present invention, included without limitation are games, tolls, fines, music, movies, and computer software and all executable products, financial products, application products, design and engineering products, drawing and architectural products and any and all search products including personal histories, genealogies, criminal histories, automotive and product histories, business histories, credit histories and the like. In short, a description of services and goods-purchased or advertised for any reason in accordance with the present invention can only be limited by one's imagination.

As will be further appreciated by those persons skilled in the art, the present inventive method and system, inclusive of one or more embodiments of its operation through various software and hardware systems, affords distinct business advantages not previously available to vendors relating to the sale of services and products. In this aspect, the present invention provides novel methods of conducting an array of business functions comprising, inter alia, designing, manufacturing, using, marketing, selling, licensing, and/or leasing the incentive subject matter, of developing business good will, of developing valuable trademark rights in conjunction with use thereof, and further in providing novel methods of business entity formation, such as partnerships, corporations, joint ventures and other collaborations for the purpose of exploiting the business of the inventive subject matter.

While this invention has been described in connection with what is presently considered to be the most practical and preferred embodiments, it is to be understood that the invention is not to be limited to the disclosed embodiments in any way as such are merely set forth for illustrative purposes. The present inventive method and system, and methods for conducting business in general, are intended to cover an array of various modification and equivalent arrangements, all of which are contemplated for inclusion within the scope and spirit of the disclosure and appended claims.

I claim:

1. A computer-implemented method for advertisement, comprising the steps of:
    (a) placing an advertisement on an Internet-based web server through a service provider or vendor with a picture that is at least partially and intentionally blurred;
    (b) offering to unblur the picture conditioned upon a transactional event with a respondent, the transactional event comprising a receipt, at the Internet-based web server, of a request to view the blurred picture, the request being received from a remote client over the Internet; and
    (c) in response to the transactional event occurring with the respondent, unblurring the picture and providing the unblurred picture to the remote client over the Internet.

2. The method of claim 1, wherein an alert of said transactional event is transmitted to the advertiser by way of mail, telegram, television, printed or written material, e-mail, SMS, EMS and/or MMS messaging.

3. The method of claim 1, wherein said advertisement refers to services and/or goods selected from a group consisting of dating services, chat room services, match making services, adult oriented services, technical support or know-how services, tutoring, language learning, and educational services, professional services including legal, medical, business, accounting, tax, engineering and design, antiques and collectibles, psychiatric, psychological, marriage counseling and counseling services in general, gaming and gambling services, handicapping services, computer software and any and all executable products, financial products, application products, banking products, credit products, design and engineering products, design and architectural products, telephone accessories, tolls, fines, music, and any and all search products, including personal histories, credit histories, genealogies, criminal histories, automotive and product histories, and business and credit histories.

4. A computer-readable medium encoded with computer-executable instructions for advertising, the instructions comprising, in no particular order:
    (a) presenting an image in conjunction with an offer to subscribe to a service, said image being at least partially obscured;
    (b) receiving a request to subscribe to the service; and
    (c) in response to the request, presenting the image unobscured.

5. The computer-readable medium recited in claim 4, wherein the partial obscurity renders contact information associated with the image unreadable.

6. The computer-readable medium recited in claim 4, wherein the image comprises a picture of a person, and wherein facial features of the person are obscured.

7. The computer-readable medium recited in claim 6, wherein the service comprises a dating service, and wherein the person is associated with the dating service.

8. A computer-implemented method for the sale or transfer of services and/or goods comprising, in no particular order:
    (a) a service provider and/or vendor receiving selection data at an Internet-based web server from a customer device, the selection data indicating a desired service and/or good;
    (b) storing the selection data; and
    (c) sending a message to the customer device in response to a triggering event, the triggering event including a notice that the desired service and/or good is available, the message indicating that the desired service and/or good is available, the message further including a blurred or partially obscured image which is related to the desired service and/or good, the message further requesting payment for a non-obscured version of the blurred or partially obscured image.

9. The method of claim 8, further comprising in no particular order the steps of:
    (a) receiving payment for the non-obscured version of the blurred or partially obscured image; and
    (b) transmitting the non-obscured version of the blurred or partially obscured image to the customer device.

10. A computer-implemented method for the sale or transfer of services and/or goods comprising in no particular order the steps of:
    (a) a service provider and/or vendor placing an advertisement on an Internet-based web server;
    (b) receiving from a customer device a response to said advertisement, the response indicating a desired service and/or good; and
    (c) transmitting a message to the customer device, the message including a blurred or partially obscured image which is a sample of the desired service and/or good, the message offering a subscription service which provides the desired service and/or good, the message further offering to unblur the blurred or partially obscured image upon receipt of payment for the subscription service.

11. The method of claim 10, further comprising in no particular order the steps of:
  (a) receiving payment for the subscription service;
  (b) sending a non-obscured version of the blurred or partially obscured image to the customer device;
  (c) sending one or more messages to the customer device in response to one or more triggering events, each of the one or more triggering events indicating that the desired service and/or good is available, each of the one or more messages including a non-obscured image which is related to the desired service and/or good.

12. The method of claim 11, further comprising one or more steps of the service provider querying the user by an SMS, EMS, and/or MMS message or other message as to personal information selected from personal preferences, personal dislikes, age, gender, race, physical description, sexual preferences, educational history, occupational history, income history, military history, health history, family history, marriage history, athletic history, smoking history, drinking history, group political affiliation history, products desire criteria, services desire criteria, and goods desire criteria, and the user responding to same.

13. The method of claim 10, wherein the desired service and/or good comprises the service provider forwarding the customer device an SMS, EMS, and/or MMS message with content indicating that said user's personal information has resulted in a comparison related objectively compatible-predicted match with one or more persons.

* * * * *